US005484338A

United States Patent [19]

Watanabe et al.

[11] Patent Number: 5,484,338

[45] Date of Patent: Jan. 16, 1996

[54] TORQUE VARIATION ABSORBING DEVICE HAVING FRICTION MEMBERS IMPARTING DIFFERENT HYSTERESIS CHARACTERISTICS TO THE DEVICE

[75] Inventors: Kazuyuki Watanabe, Kariya; Junji Kagiyama; Masakazu Kamiya, both of Toyoake, all of Japan

[73] Assignee: Aisin Seiki Kabushiki Kaisha, Kariya, Japan

[21] Appl. No.: 36,404

[22] Filed: Mar. 24, 1993

[30] Foreign Application Priority Data

Mar. 31, 1992 [JP] Japan .................................... 4-076974

[51] Int. Cl.$^{6}$ ........................................ F16D 3/12

[52] U.S. Cl. ........................................ 464/68

[58] Field of Search .................... 464/66, 68; 192/106.2; 74/574

[56] References Cited

U.S. PATENT DOCUMENTS 4,573,562 3/1986 DeLand .................................... 464/68
4,573,945 3/1986 Kajitani et al. .................................... 464/68
4,618,048 10/1986 Kobayashi .................................... 464/68
4,684,007 8/1987 Maucher .................................... 464/68
4,932,286 6/1990 Fukushima .................................... 74/574
5,073,143 12/1991 Friedman et al. .................................... 464/68

FOREIGN PATENT DOCUMENTS 64-48448 3/1989 Japan .

*Primary Examiner*—Katherine Matecki
*Assistant Examiner*—Eileen A. Dunn
*Attorney, Agent, or Firm*—Burns, Doane, Swecker & Mathis

[57] ABSTRACT

A torque variation absorbing device comprises a drive body for connecting to a drive member, a driven body for connecting to a clutch mechanism, a damping mechanism disposed between the drive body and the driven body, and a hysteresis mechanism disposed between the drive body and the driven body, wherein the hysteresis mechanism includes a low friction member which is pressed by a first elastic member, a high friction member which is pressed to one of the drive body and the driven body by a second elastic member and an engaging member so as to engage the high friction member, the engaging member disposed at the other one of the drive body and the driven body.

6 Claims, 9 Drawing Sheets

1 2 3 5 10 9 4 11 14 15 13 16 25 26 12 24 21 17 20 19 18 7 28 6 27 8 23 22

TORQUE VARIATION ABSORBING DEVICE HAVING FRICTION MEMBERS IMPARTING DIFFERENT HYSTERESIS CHARACTERISTICS TO THE DEVICE

BACKGROUND OF THE INVENTION

1. Field of the invention

This invention relates to a torque variation absorbing device for use in a driving axle system.

2. Description of the Related Art

A conventional torque variation absorbing device is disclosed in the Japanese Utility Model Laid-Open No. 64-48448 published in 1989 without examination. In FIGS. 7 and 8 the torque variation absorbing device comprises a drive body 61 which is connected to a crank shaft (not shown in the FIGURES) of an engine of a vehicle and a driven body 62 on which a clutch mechanism (not shown in the FIGURES) is mounted. The drive body 61 includes a pair of drive plates 63 and a drive wheel 64 which is connected to the drive plates 63 with a plurality of pins 65. Furthermore the drive body 61 includes a hub 67 which is connected to one of the drive plates 63 with a plurality of screws 66.

The driven body 62 includes a flywheel 68 and a driven plate 70 which is connected to the flywheel 68 with a plurality of bolts 69. A plurality of damping mechanisms 76 are disposed between the drive plates 63. A bearing 71 is disposed between the driven plate 70 and the hub 67. Furthermore a friction member 72, a thrust plate 73 and a cone spring 74 constitute a hysteresis mechanism 75 disposed between the drive plate 63 and the driven plate 70.

Because the hysteresis mechanism 75 is composed of only one friction member formed of low hysteresis material which possesses a single stage, the hysteresis mechanism 75 can efficiently absorb torque variations when the torque variation absorbing device is subjected to a low torsional angle. However the hysteresis mechanism 75 fails to absorb the sympathetic vibrations when the torque variation absorbing device is subjected to a high torsional angle. Therefore a driver is conscious of the trangient surge by the operation of the accelerator of the vehicle.

On the other hand the hysteresis mechanism formed of high hysteresis material fails to absorb the variations when the torque variation absorbing device is subjected to the low torsional angle.

SUMMARY OF THE PRESENT INVENTION

It is an object of the present invention to provide a torque variation absorbing device which absorbs both of the variations when the torque variation absorbing device has the low torsional angle and the sympathetic vibrations when the torque variation absorbing device is subjected to a high torsional angle.

It is another object of the present invention to provide a torque variation absorbing device possessing a simple structure a small size.

It is a further object of the present invention to provide a torque variation absorbing device which can be constructed and dismantled easily.

It is a further object of the present invention to provide a torque variation absorbing device which can be fabricated at a low cost.

To achieve the above mentioned objects, this invention provides a torque variation absorbing device comprising: a drive body for connecting to a drive member, a driven body for connecting to a clutch mechanism, a damping mechanism disposed between the drive body and the driven body, and a hysteresis mechanism disposed between the drive body and the driven body, wherein the hysteresis mechanism includes a low friction member which is pressed by a first elastic member, a high friction member which is pressed to one of the drive body and the driven body by a second elastic member and an engaging member so as to engage the high friction member, the engaging member disposed at the other one of the drive body and the driven body.

BRIEF DESCRIPTION OF THE DRAWINGS

The features and advantages of the torque variation absorbing device according to the present invention will be more clearly appreciated from the following description in conjunction with the accompanying drawings wherein.

DETAILED DESCRIPTION OF PREFERRED EMBODIMENTS OF THE INVENTION

Figure 1:
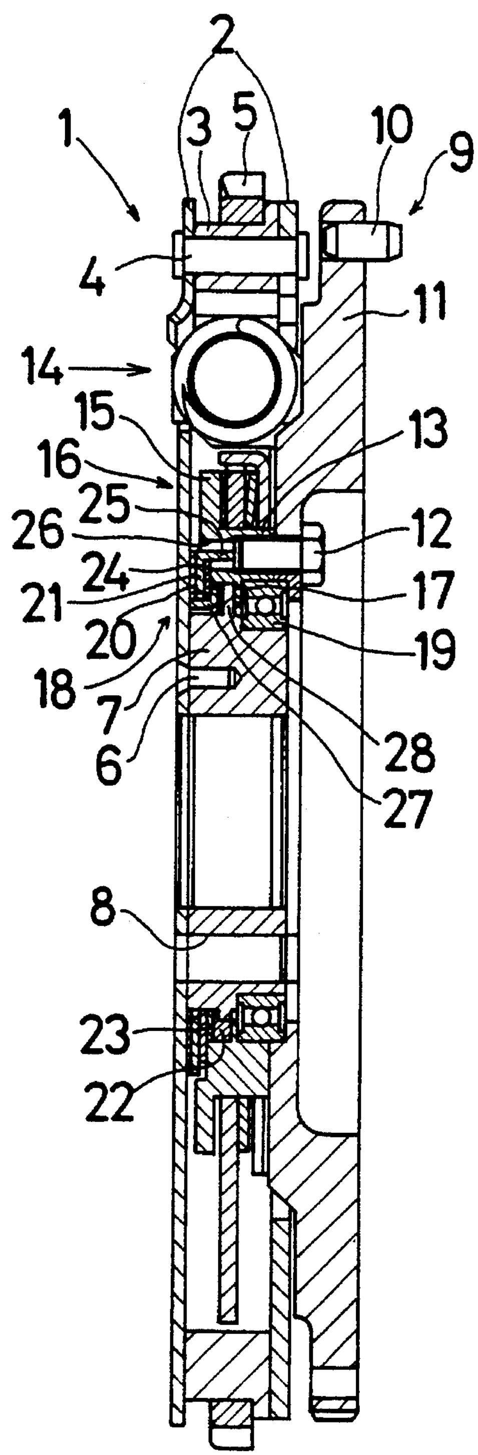
FIG. 1 is a sectional view of a first embodiment of a torque variation absorbing device of the present invention.

Referring to FIG. 1 a torque variation absorbing device comprises a drive body 1 for being connected to a crank shaft of an engine (not shown in FIGURES). The drive body 1 includes a pair of drive plates 2 and a drive wheel 3 connected to the drive plates 2 with a plurality of pins 4. The drive wheel 3 comprises a ring gear 5 engaging with a pinion gear of a engine starter (not shown in FIGURES). A hub 7 is connected to the drive plate 2 with a plurality of screws 6. A plurality of openings 8 are used for connecting the drive body 1 with the crank shaft of the engine. A driven body 9 includes a flywheel 11 which comprises a plurality of studs 10 used for determining a position of a clutch mechanism (not shown in FIGURES) mounted on the flywheel 11. The driven body 9 includes a driven plate 13 fixed to the flywheel 11 with a plurality of bolts 12. A plurality of damping mechanisms 14 are disposed between the drive plates 2. A torque limiting mechanism 16 is provided between a first flange 15 of the driven plate 13 and the flywheel 11. A hysteresis mechanism 18 is disposed between the drive plate 2 and a second flange 17 of the driven plate 13. Furthermore a bearing 19 is inserted between the hub 7 and each of the flywheel 11 and the driven plate 13.

The hysteresis mechanism 18 comprises a first friction member 20 provided so as to be contacted with one of the drive plates 2 disposed at the side of the engine. The hysteresis mechanism 18 includes a plate 21 provided so as to be contacted with the first friction member 20. A plurality of second friction members 22 formed of the high friction material in comparison with the first friction member 20 are disposed circumferentially. The second friction members 22 are provided between the flange 17 and a backing plate 23. A cone spring 24 is disposed between the plate 21 and the backing plate 23 for pressing the plate 21 and the backing plate 23. The plate 21 comprises a plurality of circumferentially arranged projections 25 each of which is inserted with a gap into a corresponding opening 26 for use in the tightening of the bolt 12. Therefore the plate 21 is rotatable together with the flywheel 11.

The backing plate 23 comprises a plurality of circumferentially arranged projections 27 and the backing plate 23 engages with the plate 21 and the first friction member 20 with a gap. Therefore the backing plate 23 is rotatable together with the plate 21 and the first friction member 20. The cone spring 24 presses the first friction member 20 and the second friction members 22. The first friction member 20 is urged to the drive plate 2 disposed on the side of the engine and the second friction members 22 are urged to the driven plate 13. The hub 7 comprises a plurality of circumferentially arranged engaging members 28. The second friction members 22 are held radially between the hub 7 and the driven plate 13. Furthermore each of the second friction members 22 makes a circumferential clearance "A" with respect to the corresponding engaging member 28 of the hub 7.

The operation of the torque variation absorbing device according to the present invention will be described hereinafter. At an initial stage the rotational torque transmitted from the crank shaft of the engine (not shown in FIGURES) is rather low. The torque variation absorbing device comprises the friction generated between the drive plate 2 disposed on the side of the engine and the first friction member 20 by the relative rotation between the drive body 1 and the driven body 9 in the first stage. The friction generated between the drive plate 2 and the first friction member 20 is shown from a point "a" to a point "b" in FIG. 10.

When the relative rotational angle between the drive body 1 and the driven body 9 arrives at "A" by the increasing of the relative rotation between the drive body 1 and the driven body 9 in a second stage, the engaging members 28 of the hub 7 contact with the second friction members 22. Therefore the second friction members 22 rotate together with the drive plates 2 and the relative rotation is generated between the second friction members 22 and each of the backing plate 23 and the driven plate 13. The friction generated between the second friction members 22 and each of the backing plate 23 and the driven plate 13 is shown from a point "c" to a point "d" in FIG. 10. The hysteresis torque generated from the point "c" to "d" is higher than the hysteresis torque generated from the point "a" to "b".

Figure 10:
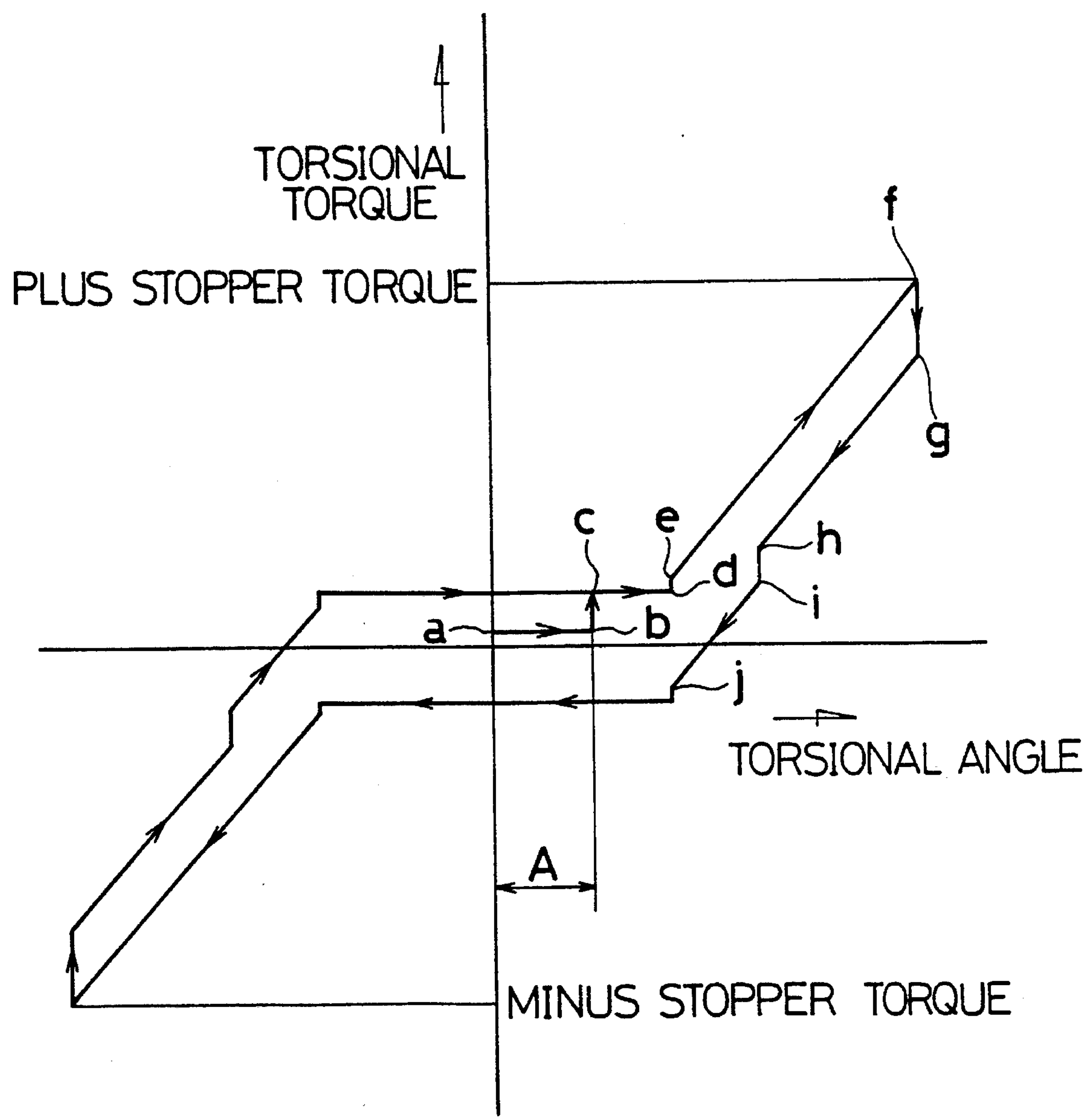
FIG. 10 is a characteristic diagram which shows the relation between the torsional angle and the torsional torque of a torque vibration absorbing device of the present invention.

In a third stage when the damping mechanism 14 starts to be compressed at the point "d", the torsional torque between the drive body 1 and the driven body 9 which is shown from a point "e" to a point "f" in FIG. 10 increases relative to the increasing of the torsional angle between the drive body 1 and the driven body 9.

When the rotational torque transmitted from the crank shaft to the drive plates 2 is over the plus stopper torque at a point "f", the torque limiting mechanism 16 slips. Therefore the torsional torque between the drive body 1 and the driven body 9 does not increase any more.

To the contrary when the relative rotational angle between the drive body 1 and the driven body 9 starts to decrease, the hysteresis torque between the second friction members 22 and each of the backing plate 23 and the driven plate 13 is not generated because of the circumferential clearance "A" provided at the opposite side of the above contacting portion of each of the engaging members 28 with the corresponding second friction member 22.

However when the engaging members 28 of the hub 7 contact with the second friction members 22 at a point "h", the hysteresis torque between the second friction members 22 and each of the backing plate 23 and the driven plate 13 is once again generated. Therefore the hysteresis torque shown from a point "i" to a point "j" in FIG. 10 is higher than the hysteresis torque shown from the point "g" to the point "h".

In the above mentioned structure the torque variation absorbing device can generate the high hysteresis torque and the low hysteresis torque corresponding to the relative torsional angle between the drive body 1 and the driven body 9. Furthermore in the above construction the cone spring 24 presses the first friction member 20 and the second friction members 22. Therefore the torque variation absorbing device can be useful for decreasing the number of components of the device and the miniaturization in the axial direction of the device. The torque variation absorbing device can generate the high hysteresis torque in any range of the torsional angle by varying the circumferential clearance "A".

Figure 3:
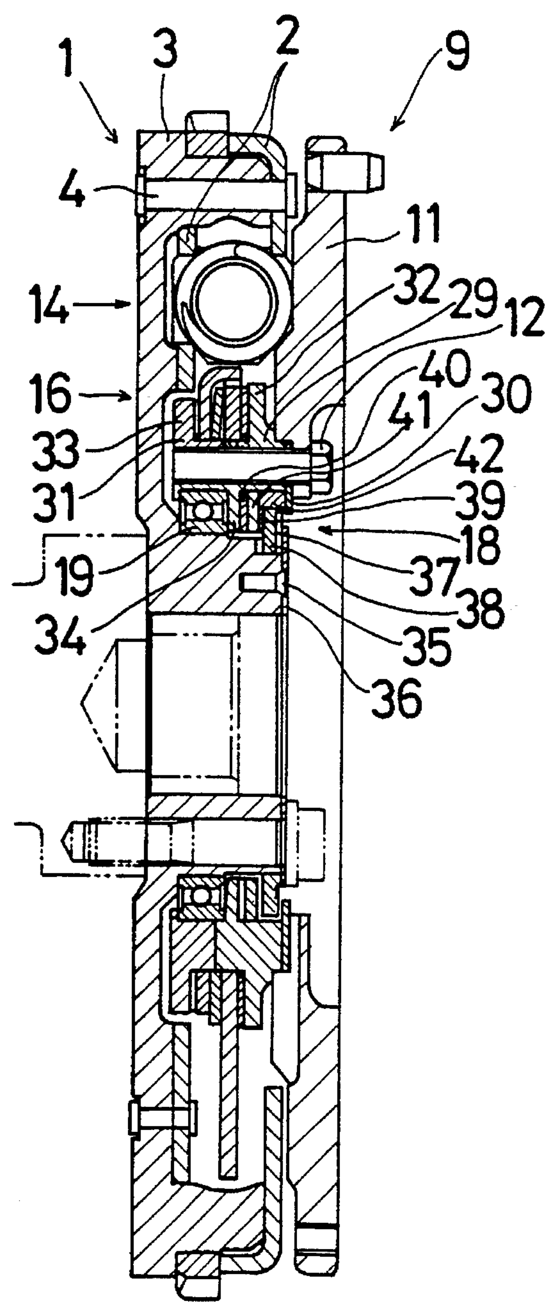
FIG. 3 is a sectional view of a second embodiment of a torque variation absorbing device of the present invention.
Figure 2:
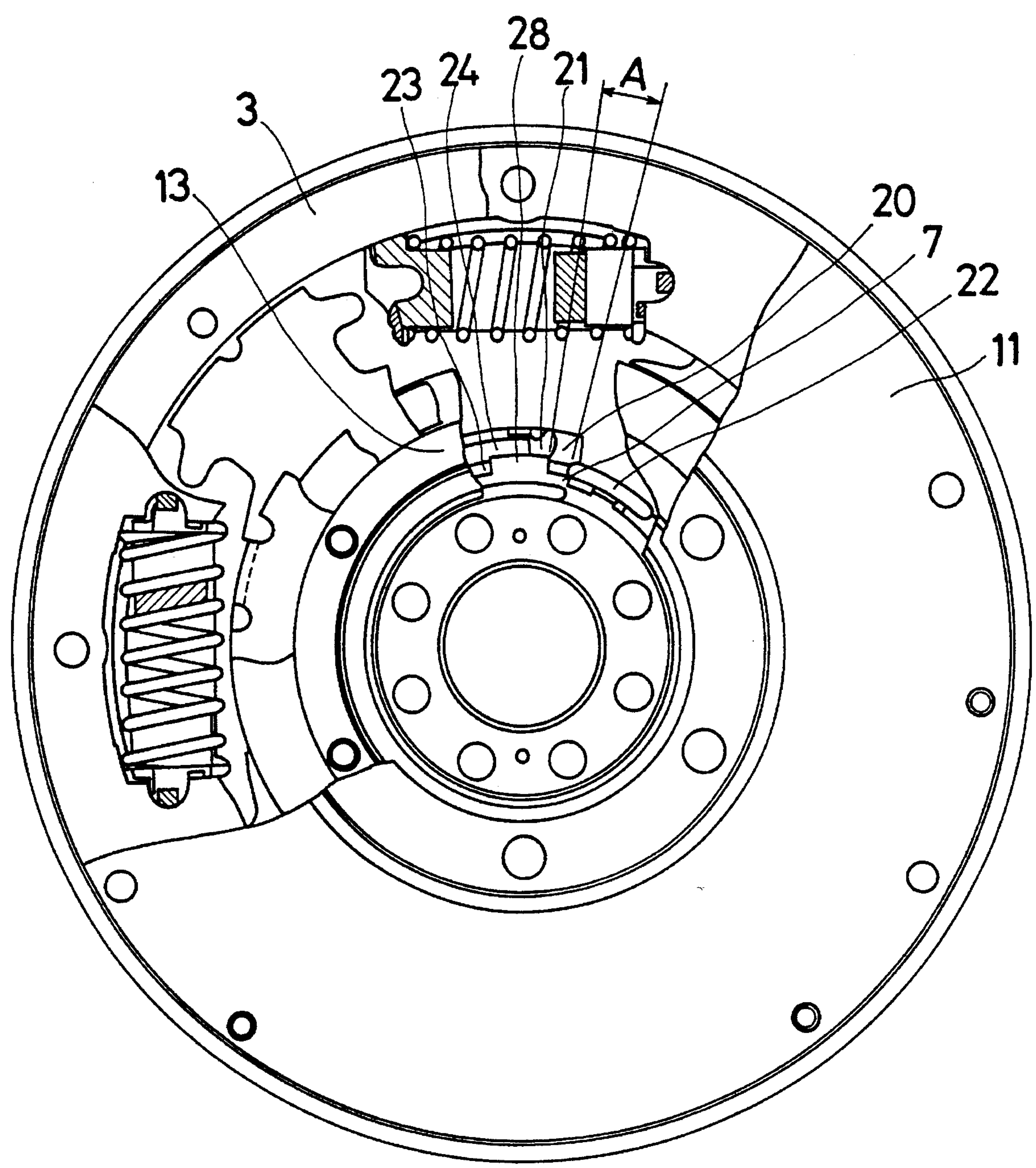
FIG. 2 is an elevational view of FIG. 1.
Figure 4:
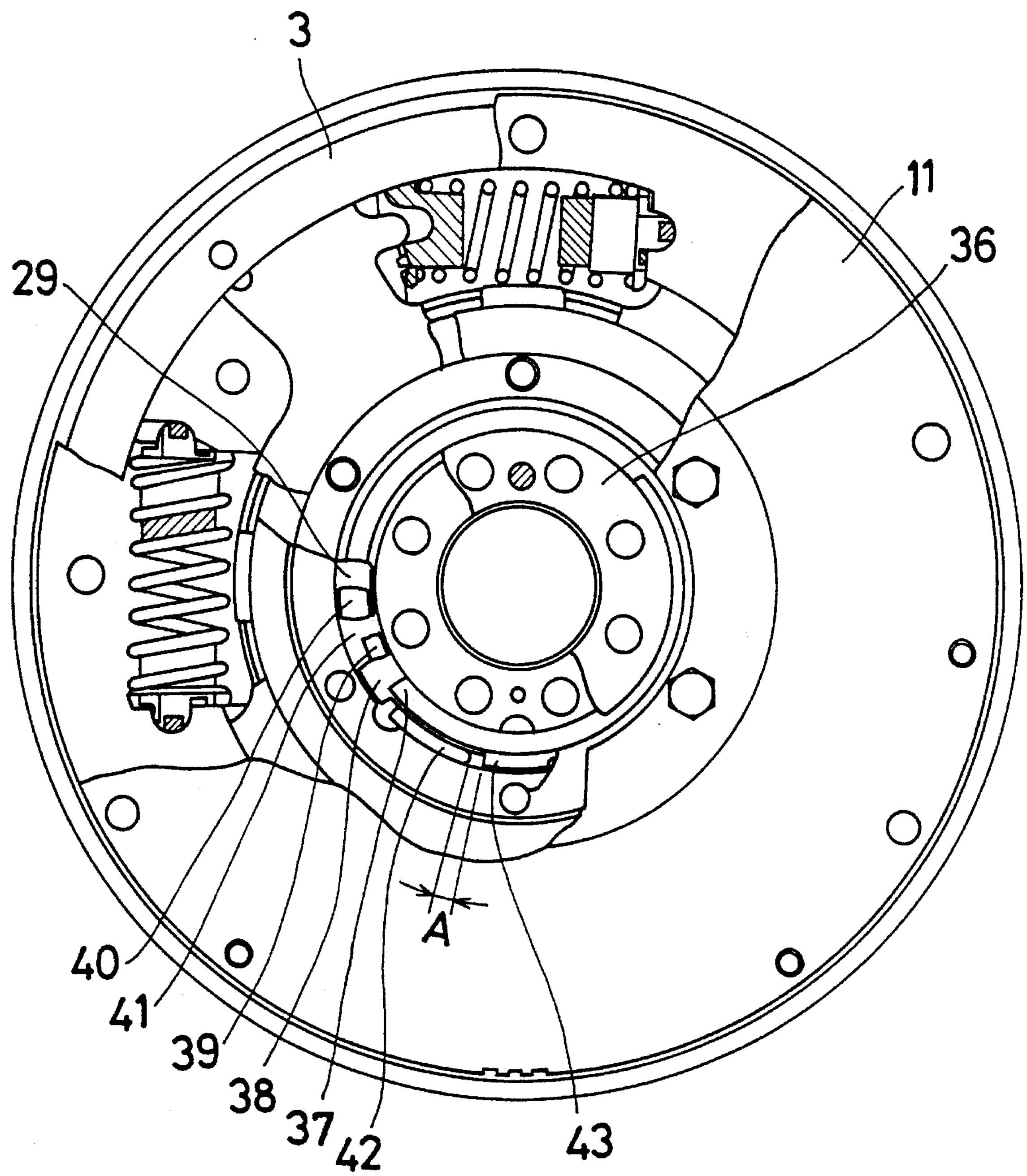
FIG. 4 is an elevational view of FIG. 3.

The second embodiment of the torque variation absorbing device according to the present invention will be described hereinafter. In FIG. 3 and FIG. 4 each of the members which are identified by reference numerals that are the same as reference numerals used to identify members in the first embodiment function in the same manner as the corresponding members in the first embodiment. The damping mechanisms 14 are disposed between the drive plates 2. A first driven plate 29 is fixed to the flywheel 11 through a plate 30 by the bolts 12. A second driven plate 31 is fixed to the first driven plate 29 by the bolts 12. The torque limiting mechanism 16 is disposed between a first flange 32 of the first driven plate 29 and a first flange 33 of the second driven plate 31. The bearing 19 is disposed between a second flange 34 of the first driven plate 29 and the drive wheel 3. A disc plate 36 is fixed to the drive wheel 3 by a plurality of screws 35.

The hysteresis mechanism 18 is provided between the second flange 34 and each of the plate 30 and the disc plate 36. The hysteresis mechanism 18 comprises a first cone spring 37 contacting with the disc plate 36, a backing plate 38 contacting with the first cone spring 37 and a first friction member 39 contacting with the backing plate 38. The hysteresis mechanism 18 comprises a second cone spring 40 contacting with the second flange 34, a backing plate 41 contacting with the second cone spring 40 and a plurality of second friction members 42 disposed circumferentially between the backing plate 41 and the plate 30. The first friction member 39 contacts with the backing plate 41 by the elastic force of the first cone spring 37. The backing plate 38 comprises a plurality of circumferentially arranged engaging members 43. The second friction members 42 are held radially between the first driven plate 29 and the backing plate 38. Furthermore each of the second friction members 42 comprises circumferential clearance "A" with respect to the corresponding engaging member 43 of the backing plate 38.

In the above second embodiment the first friction member 39 and the second friction members 42 can be exchanged by removing the bolts 12, the disc plate 36 and the plate 30 without removing the pins 4, the drive plates 2 and the drive wheel 3. The torque variation absorbing device can exhaust the wearing powder generated at the hysteresis mechanism 18 through the gap between the disc plate 36 and the plate 30. Therefore the characteristic of the hysteresis mechanism 18 can be stable and the torque variation absorbing device prevents the hysteresis mechanism 18 from wearing biassedly. Furthermore the torque variation absorbing device can be useful for saving the components of the device because the backing plate 38 serves as both a backing plate to the first friction member 39 and an engaging member with the second friction members 42.

Figure 5:
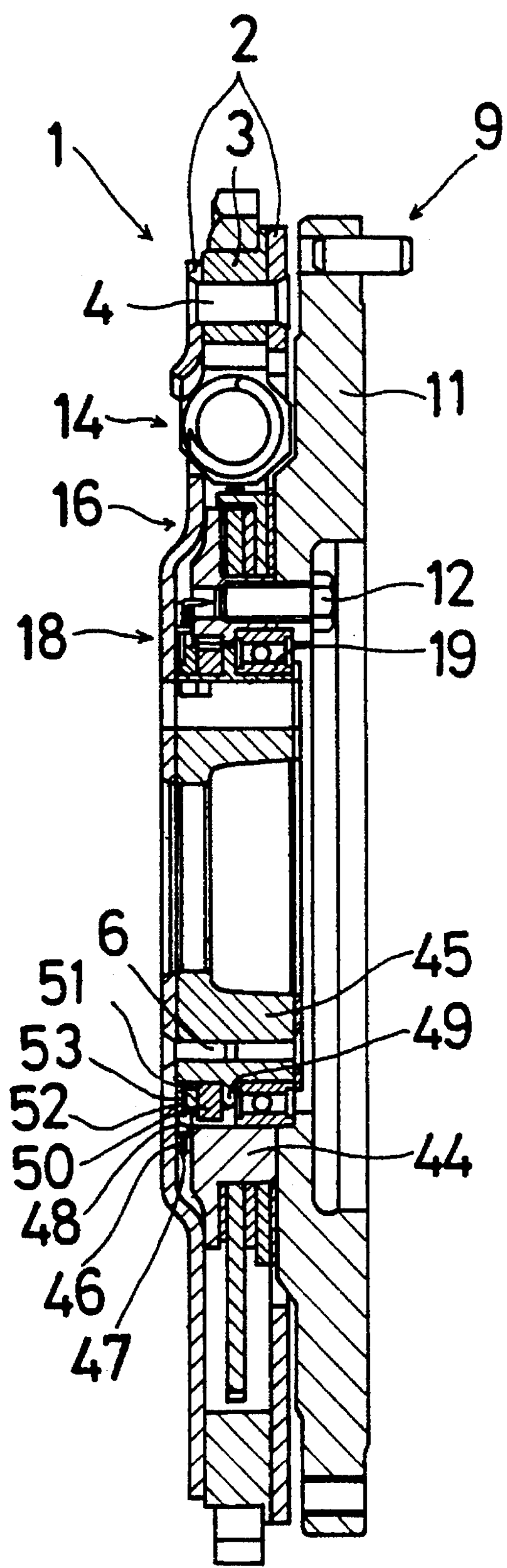
FIG. 5 is a sectional view of a third embodiment of a torque variation absorbing device of the present invention.
Figure 6:
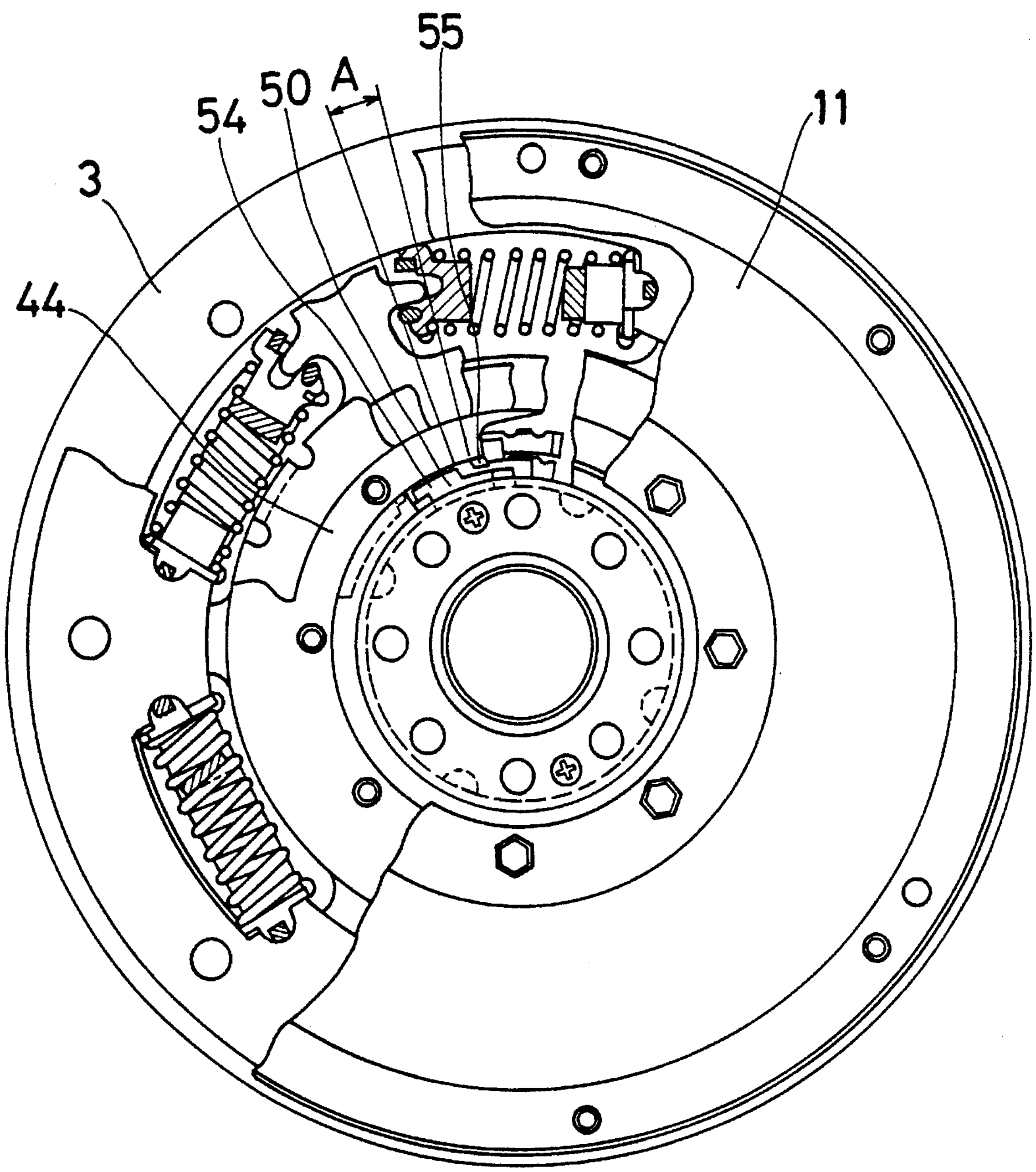
FIG. 6 is an elevational view of FIG. 5.
Figure 7:
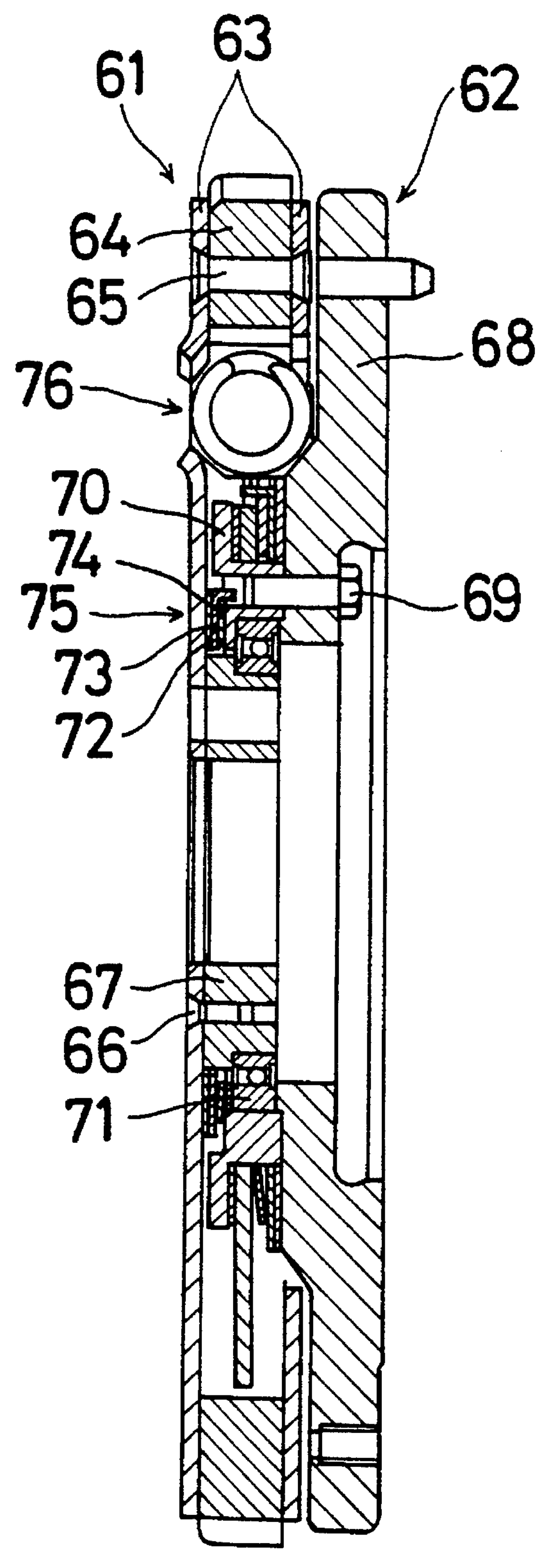
FIG. 7 is a sectional view of a torque variation absorbing device of the prior art.
Figure 8:
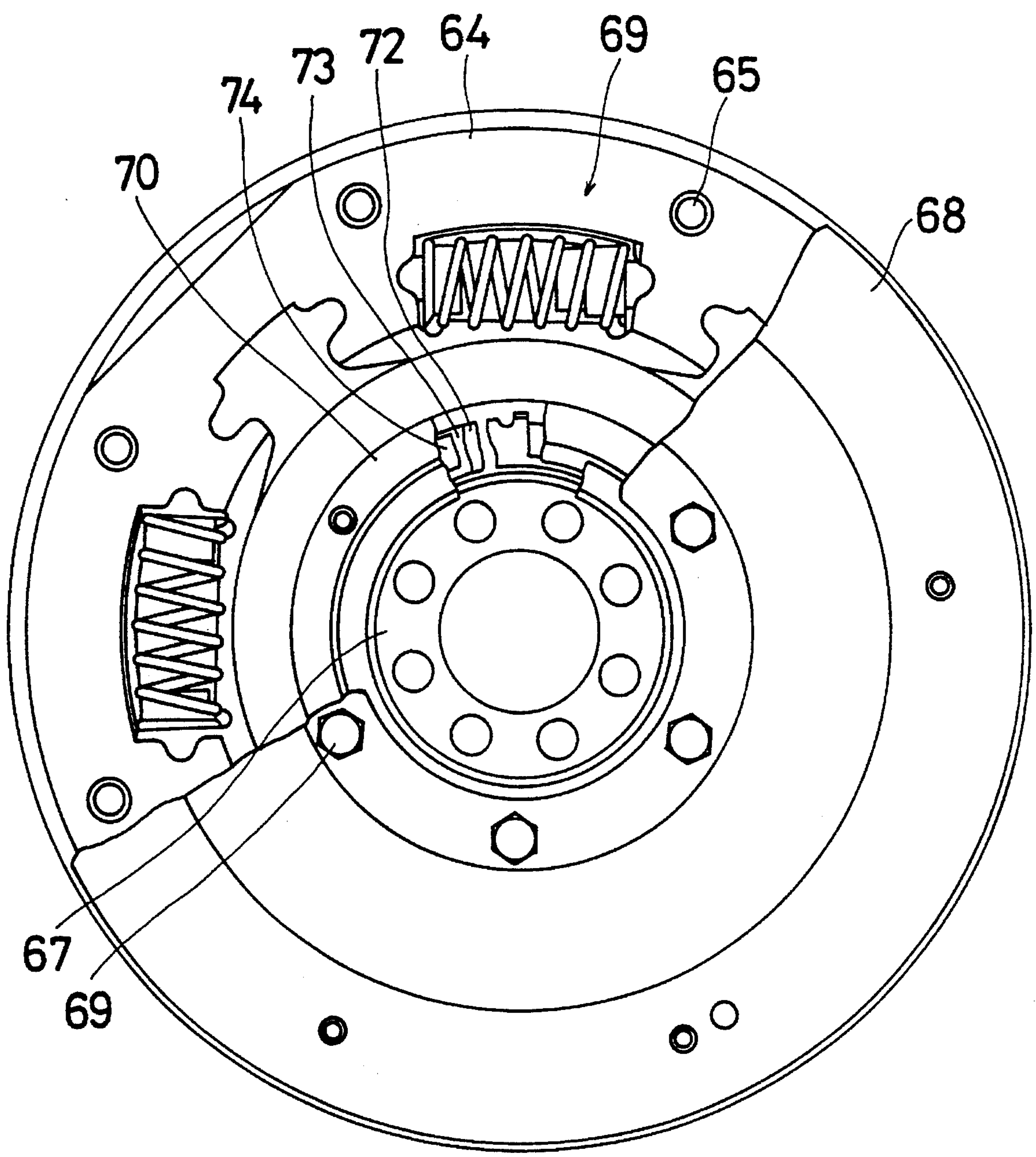
FIG. 8 is an elevational view of FIG. 7.
Figure 9:
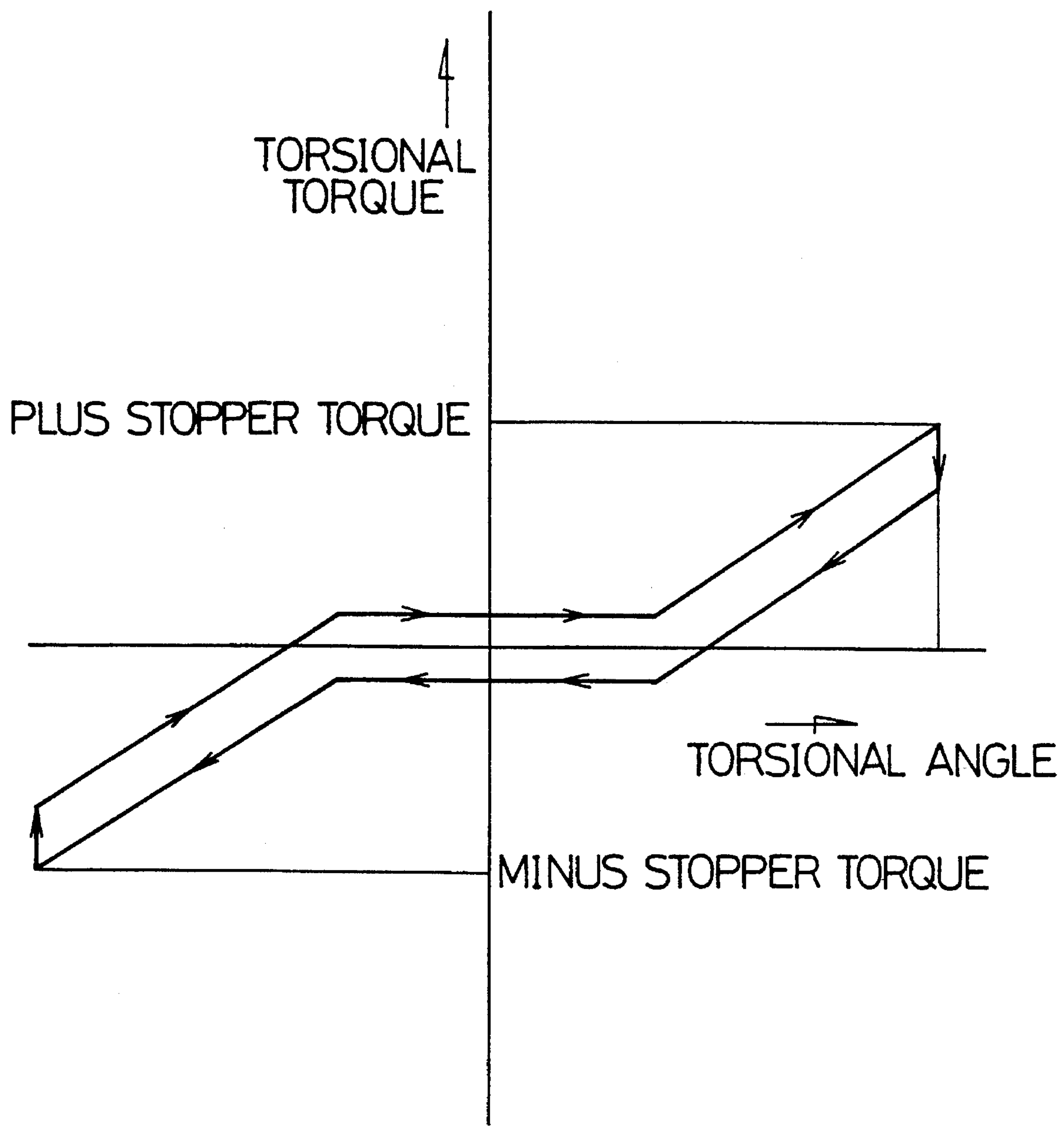
FIG. 9 is a characteristic diagram which shows the relation between the torsional angle and the torsional torque of a torque vibration absorbing device shown in each FIG. 7 and FIG. 8.

The third embodiment of the torque variation absorbing device according to the present invention will be described hereinafter. In FIG. 5 and FIG. 6 each of the members identified with a reference numeral that corresponds to a reference numeral used in the first embodiment and the second functions in the same manner as the corresponding member in the first embodiment and the second embodiment. A driven plate 44 is fixed to the flywheel 11 by the bolts 12 and a hub 45 is fixed to the drive plate 2 by the screws 6. The hysteresis mechanism 18 is provided between drive plate 2 of the side of the engine and each of the driven plate 44 and the hub 45. The hysteresis mechanism 18 comprises a first friction member 46 contacting the drive plate 2 and a first cone spring 48 pressing the first friction member 46 toward the drive plate 2 through a backing plate 47. The hysteresis mechanism 18 comprises a second friction member 50 contacting a flange 49 of the hub 45, a backing plate 51 contacting the second friction member 50, a second cone spring 52 contacting the backing plate 51 and a plate 53 made of a highly wear-resistant material.

The second friction member 50 is formed with a ring-shaped configuration and comprises a plurality of circumferentially arranged projecting portions 54. Therefore the second friction member 50 can be fitted to the torque variation absorbing device and removed from the torque variation absorbing device easily. The driven plate 44 comprises a plurality of circumferentially arranged engaging members 55. Furthermore each of the projecting portions 54 comprises circumferentially arranged clearance "A" with the corresponding engaging member 55 of the driven plate 44.

While the invention has been particularly shown and described with references to preferred embodiments thereof, it will be understood by those skilled in the art that the foregoing and other changes in form and details can be made therein without departing from the spirit and scope of the invention.

What is claimed is:

1. A torque variation absorbing device comprising:

a drive body adapted to be connected to a drive member;

a driven body adapted to be connected to a clutch mechanism;

a damping mechanism disposed between the drive body and the driven body;

a hysteresis mechanism disposed between the drive body and the driven body, the hysteresis mechanism including:

a first friction member disposed between the drive body and the driven body to generate friction during relative movement between the drive body and the driven body, a plate member which rotates with one of the drive body and the driven body, at least one second friction member disposed between the plate member and said one of the drive body and the driven body to generate friction during relative movement between the drive body and the driven body, and an engaging member disposed at the other one of the drive body and the driven body to engage the second friction member when the drive body rotates a predetermined angle with respect to the driven body;

a torque limiting mechanism for limiting torque generated between the drive body and the driven body after the first and second friction members have generated friction.

2. The torque variation absorbing device according to claim 1, wherein said at least one second friction member includes a plurality of second friction members disposed between the plate member and the driven body.

3. The torque variation absorbing device according to claim 1, wherein said second friction member is formed of a material having a higher friction coefficient than material of which the first friction member is made.

4. The torque variation absorbing device according to claim 1, wherein the drive body includes a plurality of drive plates each connected to a hub, said driven body including a driven plate fixed to a flywheel, said engaging member being one of a plurality of engaging members circumferentially arranged on the hub.

5. The torque variation absorbing device according to claim 4, including a plurality of second friction members each held radially between the hub and the driven plate, and each second friction member forming a clearance with respect to a corresponding one of the engaging members of the hub that is equal to the predetermined angle of movement of the drive body relative to the driven body.

6. The torque variation absorbing device according to claim 1, including elastic means positioned between the plate member and the drive body for urging the plate member toward the driven body.

* * * * *